Feb. 8, 1949.　　　　　A. W. MOFFAT　　　　　2,461,479
TEMPORARY SUPPORT FOR USE IN LOADING
PALLETS OR THE LIKE
Filed Dec. 23, 1946　　　　　　　　　　3 Sheets-Sheet 1

INVENTOR.
Alexander W. Moffat
BY
Rowland V. Patrick
ATTORNEY

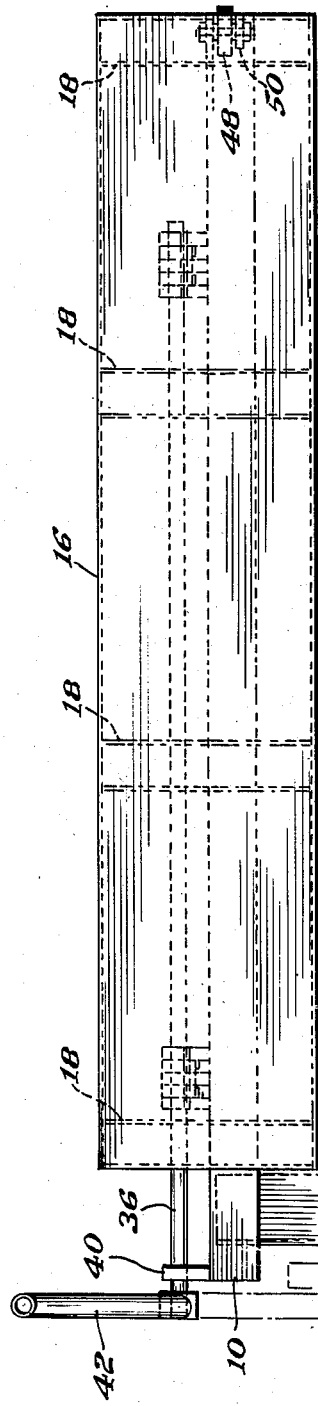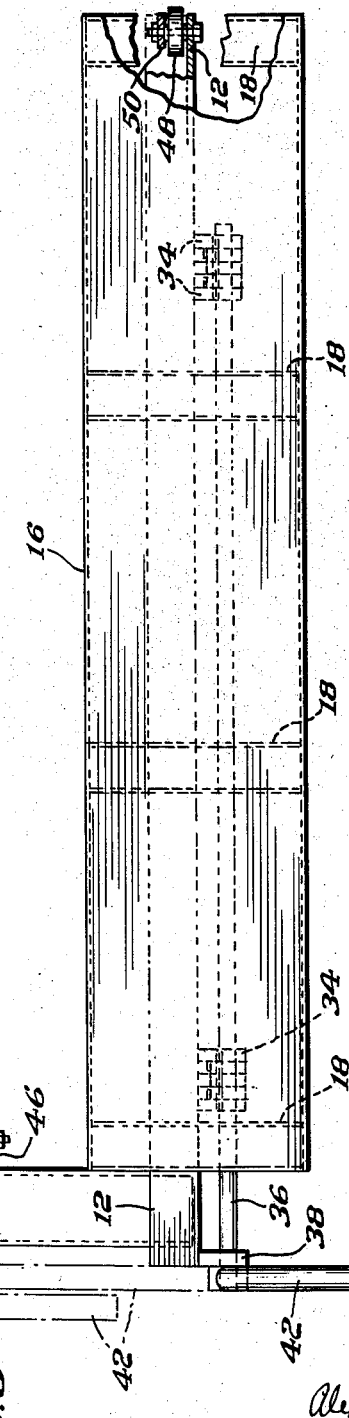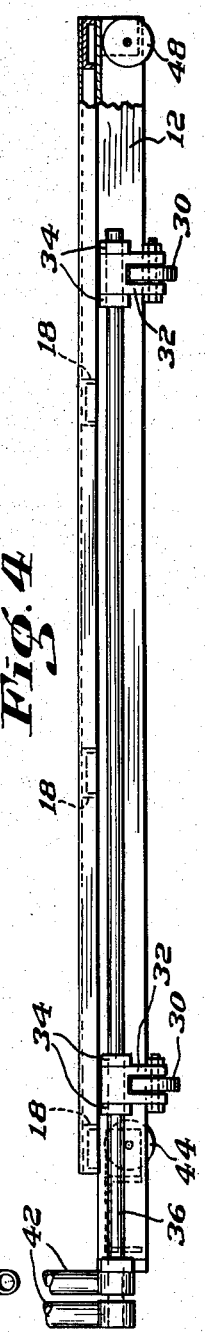

Feb. 8, 1949.   A. W. MOFFAT   2,461,479
TEMPORARY SUPPORT FOR USE IN LOADING
PALLETS OR THE LIKE
Filed Dec. 23, 1946   3 Sheets-Sheet 3
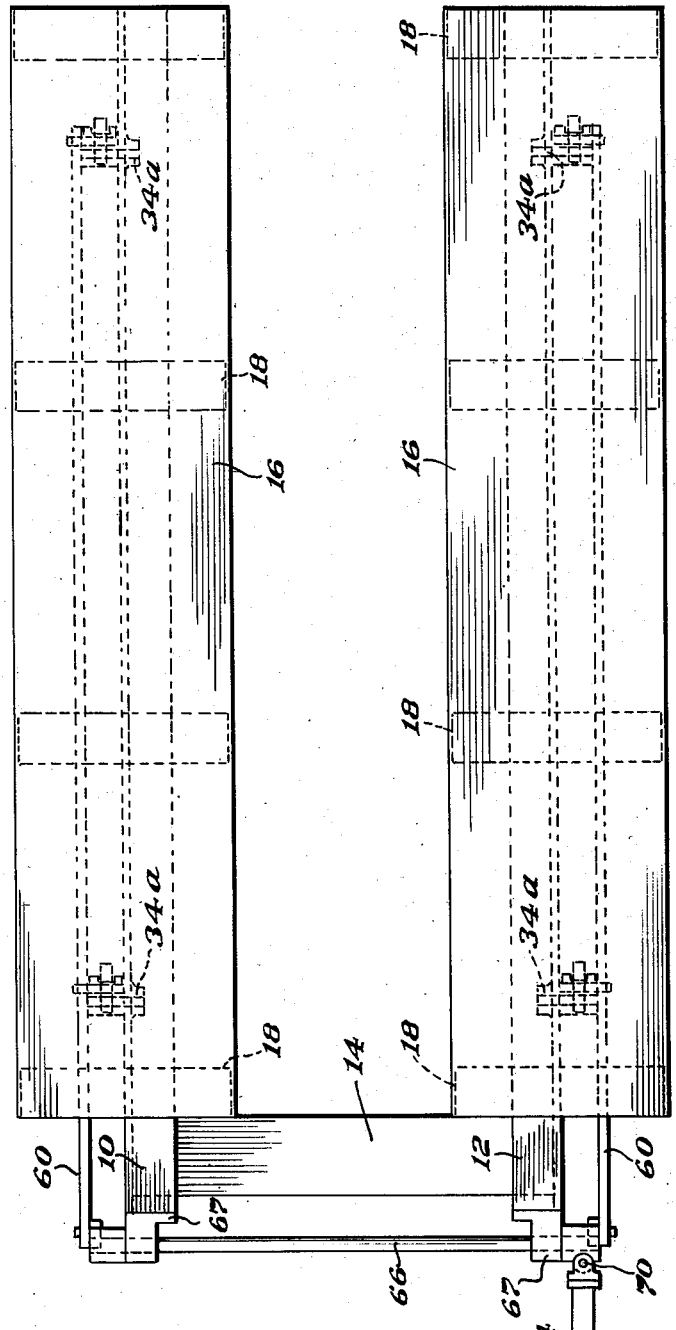
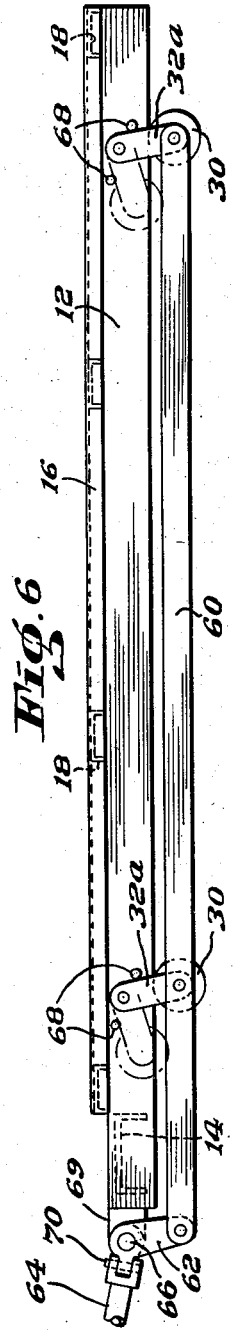
INVENTOR.
Alexander W. Moffat
Rowland V. Patrick
BY Patented Feb. 8, 1949

2,461,479

UNITED STATES PATENT OFFICE 2,461,479

TEMPORARY SUPPORT FOR USE IN LOADING PALLETS OR THE LIKE

Alexander W. Moffat, Boston, Mass., assignor to Norman L. Cahners, doing business as Materials Handling Laboratories, Boston, Mass.

Application December 23, 1946, Serial No. 718,039

8 Claims. (Cl. 280—44)

This invention relates to pallet or skid loading and is concerned with the provision of a jig or temporary support for augmenting the compressive strength of a pallet or skid, particularly in the areas of the span of the platform of the pallet, during the loading of cartons or other units thereon and prior to their being rigidified by adhesive, strapping or other interlocking into a unit load, after which time the augmented compressive strength is unnecessary.

The device is designed particularly for use in the loading of expendable pallets, wherein the pallet platform, while having sufficient strength to support the complete load after rigidification into a unit load, may be damaged by careless handling of the units during loading or by inaccurate loading. For example, it is customary to load pallets in a pattern according to the particular size of the individual cartons or units being loaded. Since units of a first layer have to be individually and successively positioned on the pallet, an individual unit may be so positioned as to apply momentarily an undue stress to a single area of the pallet. After completion of the loading, this undue stress at a single area will no longer be present because of the distribution of the load by reason of the interb'ocking, and interlocking of the units into a rigid unit load.

Use of devices of this invention during pallet loading minimizes pallet destruction by displacement or improper dropping of individual units thereon, particularly first layer units, and is especially useful in connection with the loading of expendable pallets, wherein the material constituting the platform is, for reasons of minimizing expense, designed to support satisfactorily a rigidified unit load, but does not have sufficient rigidity to withstand mistreatment during loading.

For the above purposes, and as will be hereinafter described, devices of this invention are adapted to have positioned thereon a pallet in such manner that the support of the platform and hence the compressive strength of the pallet afforded by its own legs is augmented by a support in areas between the legs by the loading accessory constituting this invention. After loading the pallet and rigidifying the loaded articles into a unit load, the device is so constructed and arranged that it may be lowered for ready withdrawal from beneath the loaded pallet for re-use, leaving the pallet and its load ready for transportation by conventional low-lift hand trucks and/or high-lift fork trucks operating on the cantilever principle.

Embodiments of the invention are shown in the accompanying drawings, wherein

Fig. 3 is a plan view of the support shown in Figs. 1 and 2, with the movement of certain parts thereof to different positions indicated by dot-dash lines;

Fig. 4 is a side elevation of the support shown in Fig. 3;

Fig. 5 is a plan view, similar to that shown in Fig. 3, of a modified form of support; and Fig. 6 is a side elevation of the support shown in Fig. 5.

Figure 1:
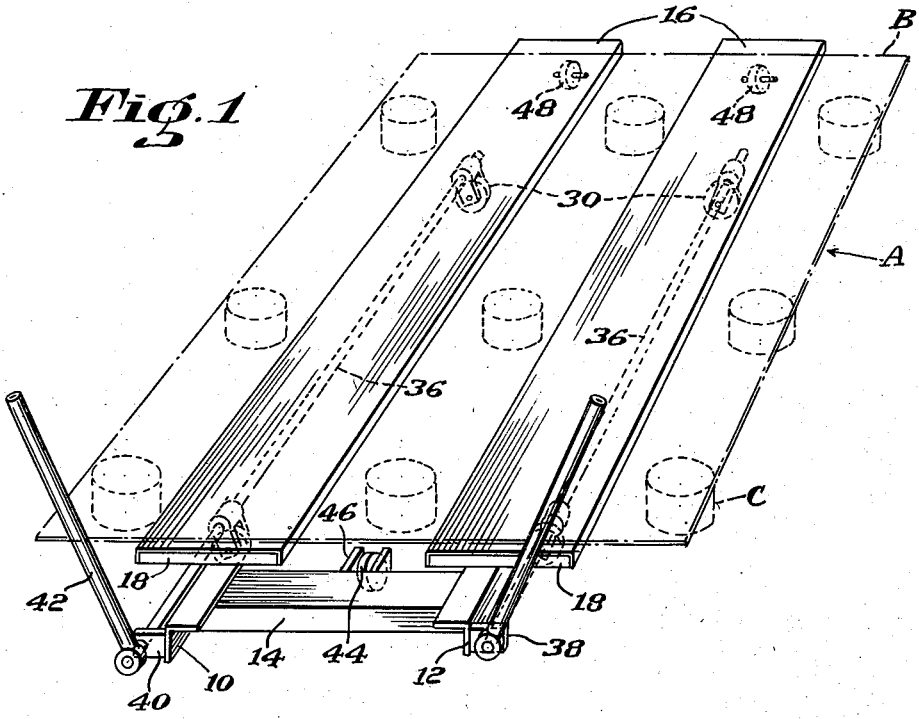
Fig. 1 is a perspective view of the support of the invention having superposed thereon an expendable pallet, shown in dot-dash lines, in a position for loading articles on the pallet.

The support of this invention is constructed of metal and comprises a U-shaped frame formed of two parallelly extending angle-irons 10 and 12 joined at their forward ends by a cross-channel element 14 forming the base of the U and welded or otherwise secured to the under-surfaces of the flanges of the angle-irons 10 and 12. Superposed on each angle-iron is a channel-shaped plate 16 suitably cross-braced by spaced transverse channel elements 18. The plates 16 have top surfaces of substantial area, and are of such width and length that they are adapted to provide support beneath the spans of an expendable pallet A superposed thereover. The drawings show an expendable pallet A, such pallet having a flat elevated platform B and a series of nine spaced tubular supporting members C. The supporting members C are so spaced as to leave openings beneath the platform B for the insertion of the parallelly extending spaced forks of a conventional fork-lift truck.

The pallet A is thus adapted to be superposed upon the temporary support of this invention with the central row of supporting members or legs C extending down between the plates 16 and the two outer rows of supporting members C extending down on each side of the plates 16.

In order to hold the support of this invention with the top surfaces of plates 16 just beneath or contacting the lower surface of the platform B along the longitudinal spans thereof, the support is provided with supporting members which take the form of a series of rollers 30. Two of these rollers are disposed beneath each of the plates 16 and are journaled on arms 32 which are pivotally mounted with respect to angle irons 10 and 12 so that the rollers 30 may be moved through vertical planes parallel to the base 14 of the U, from the positions shown in full lines in Fig. 2, relatively remote from plate 16, to the positions shown in dot-dash lines in Fig. 2, relatively adjacent plates 16. For this purpose, angle irons 10 and 12 have welded or otherwise affixed thereto spaced bifurcated bearings 34 in which are journaled longitudinally extending shafts 36, arms 32 carrying the rollers 30 being keyed on the shafts 36 between the bifurcations of the bearings 34.

The shafts 36 extend at the front of the support beyond the plates 16 and through guides 38 and 40. At the front end of each shaft is attached an upwardly extending handle 42.

Figure 2:
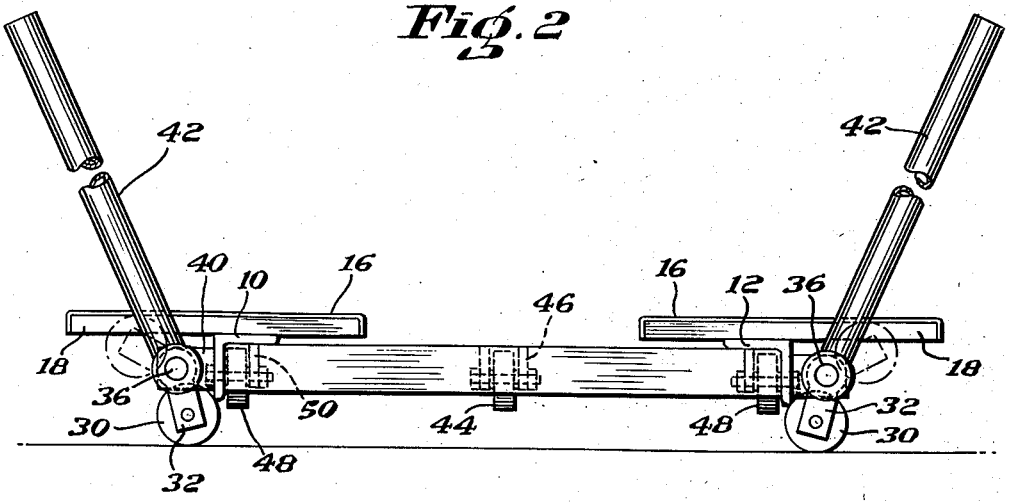
Fig. 2 is an end elevation of the device shown in Fig. 1, with the handles broken away to indicate extent.

By reason of this construction, it will be seen that movement of the handles 42 from the positions shown in Fig. 2 inwardly in opposite directions will rotate the shafts 36 and pivot arms 32 and rollers 30 from their full line positions, as shown in Fig. 2, to their dot-dash line positions in Fig. 2, with the handles 42 moving to the dot-dash line positions shown in Fig. 3.

To support the device after the rollers 30 have been pivoted to the dot-dash line positions, the frame is provided with an independent series of rollers, shown in the drawings as being three in number, one of these, 44, being journaled on a bracket 46 extending backwardly from the channel member 14 which forms the base of the U. The other two rollers 48 are journaled beneath the rear ends of the plates 16 between extensions 50 extending downwardly from angle irons 10 and 12 and the vertical flanges of the angle irons. As shown by Fig. 2, the rollers 44 and 48 extend beneath the plates 16 a fixed equal distance to positions intermediate the full line positions of rollers 30, as shown in Fig. 2, and the dot-dash line positions of the rollers 30 shown in Fig. 2.

Accordingly, when the handles 42 are manipulated to pivot the rollers 30 from the full line to the dot-dash line positions shown in Fig. 2, the device will drop from a high level to a lower level supported on rollers 44 and 48 which, being journaled transversely of the device permit the device to be withdrawn at the lower level from beneath the pallet A after the pallet has been loaded.

As clearly shown in Fig. 2, in the full line positions of the rollers 30, their axes are on one side of plumb lines extending through the axes of the shafts 36, just across the dead center, and, in the dot-dash line positions, are on the other side of the plumb lines. Accordingly, in the position of the handles shown in Fig. 2 the device is locked at its upper level position and the parts are so dimensioned that, in this position, the distance from the floor to the top of the plates 16 is substantially equal to the height of the legs of the pallet for which the device is intended to provide support during a loading operation.

As will be understood, the device is not adapted to lift the loaded pallet, except as caused by pivoting the rollers across the dead center position to lower the device when loading is completed. When the handles have been lowered to substantially horizontal positions, as indicated by the dot-dash lines in Fig. 3, the weight of the handles acts to retain the rollers 30 in their pivoted upper positions, permitting the rollers 44 and 48 to support the device.

In the modified form shown in Figs. 5 and 6 the fixed series of rollers 44 and 48 are dispensed with, and the rollers 30 are mounted on axes extending transversely of the device so that the rollers in raised position function to support the device at the lower level. For this purpose the arms 32a, on which the rollers 30 are mounted, are pivoted on bearings 34a affixed to the angle irons 10 and 12 for movement about transverse axes and in vertical planes extending longitudinally of the device. In order to move the plates 16 from high level to low level the arms 32a and rollers 30 are pivoted from the full line positions shown in Fig. 6 to the dot-dash line positions. This is accomplished through linkage of the journals of the rollers 30 by pivoted links 60 and 62, the later being fixedly mounted on a transverse shaft 66 journaled in bearings 67 extending forwardly from angle irons 10 and 12. One of the links 62 is a bell crank and has a handle 64 pivoted to one of the arms thereof. Thus by movement of the handle 64 from lowered position to an upright position, the linkages act to pivot the rollers 30 into their dot-dash lines positions, thus lowering the device and permitting its withdrawal. As shown in Fig. 6, suitable stops 68 are provided to limit pivotal movement of arms 32a, the positions of the arms 32a, when the rollers 30 are lowered, being, as in the case of the device of Figs. 1 to 4, just across plumb lines extending through the axes of the pivots of the arms. The pivot 70 of the handle permits it to be lowered transversely from upright position.

I claim:

1. A device for temporarily augmenting the compressive strength of a pallet or the like during operations of positioning and rigidifying a load of individual units thereon comprising a U-shaped frame, the legs of said U having parallelly extending top surfaces of substantial area, a series of rollers extending downwardly beneath each leg of said frame, said rollers being pivotally mounted on said frame for movement in vertical planes parallel to the base of said U from positions relatively remote from said surfaces for supporting said frame with said surfaces at a predetermined level, furnishing support beneath spans of the platform of a pallet positioned over said device, to positions relatively adjacent said surfaces for permitting said surfaces to be lowered away from said platform and said device to be withdrawn from beneath said pallet on completion of a loading operation.

2. A device as claimed in claim 1, including means for locking said rollers in said remote positions.

3. A device for temporarily augmenting the compressive strength of a pallet or the like during operations of positioning and rigidifying a load of individual units thereon comprising a U-shaped frame, the legs of said U having parallelly extending top surfaces of substantial area, a series of rollers spaced longitudinally along and extending downwardly beneath each leg of said frame, said rollers being pivotally mounted on said frame, for movement from positions relatively remote from said surfaces with the axes of said rollers just across the plumb lines through the axes of the respective pivots, for supporting said frame with said surfaces at a predetermined level and furnishing support beneath spans of the platform of a pallet positioned over said device, to positions relatively adjacent said surfaces and across said plumb lines from said remote positions for permitting said surfaces to be lowered away from said platform and supporting said frame in said lowered position for permitting said device to be withdrawn from beneath said pallet on completion of a loading operation.

4. A device as claimed in claim 3, including handles mechanically connected to said rollers for pivotally moving said rollers from one to the other of said positions.

5. A device for temporarily augmenting the compressive strength of a pallet or the like during operations of positioning and rigidfying a load of individual units thereon, comprising a U-shaped frame, the legs of said U having parallelly extending horizontal top surfaces of substantial area, a series of rollers pivotally mounted on said frame and movable in vertical planes parallel to the base of the U from positions relatively adjacent said surfaces to positions relatively remote from said surfaces for selectively supporting the device with said surfaces at a relatively high level when said rollers are in said relatively remote positions, and a second series of rollers for supporting the device with said surfaces at a lower level when said pivotally mounted rollers are in said relatively adjacent positions.

6. A device as claimed in claim 5 having handles mechanically connected to said pivotally mounted rollers and extending at one end of said device for moving said pivotally mounted rollers from said remote to said adjacent positions for lowering said surfaces to said lower level.

7. A device for temporarily augmenting the compressive strength of a pallet, or the like, during operations of positioning and rigidifying a load of individual units thereon comprising a U-shaped frame, the legs of said U having horizontal top surfaces of substantial area, a series of rollers pivotally mounted on said frame and spaced longitudinally along and extending downwardly beneath each leg of said frame for movement from positions relatively adjacent said surfaces to positions relatively remote from said surfaces for selectively supporting the device with said surfaces at a relatively high level when said rollers are in said relatively remote positions, to furnish support beneath spans of the platform of a pallet positioned over said device, a handle extending at one end of said device, and mechanical connections mounted longitudinally of said frame and connecting said handle and the pivoted rollers beneath at least one of said legs, whereby said rollers may be pivoted by said handle from one to the other of said positions.

8. A device for temporarily augmenting the compressive strength of a pallet or the like during operations of positioning and rigidifying a load of individual units thereon, comprising a U-shaped frame, the legs of said U having top surfaces of substantial area, means mounted on said frame for supporting said frame with said surfaces horizontally disposed at a predetermined level to furnish support beneath spans of the platform of a pallet positioned over said device, and means mounted on said frame and independent of said first-named supporting means for supporting said surfaces at a level lower than said predetermined level for permitting said device at its lower level to be withdrawn from beneath said pallet on completion of a loading operation, said first-named supporting means comprising a series of rollers pivotally mounted on said frame for movement in vertical planes parallel to the base of said U from positions relatively remote from said surfaces to positions relatively adjacent said surfaces for permitting said surfaces to be lowered from one level to the other level, and said second-mentioned supporting means comprising a series of rollers extending below said surfaces a fixed equal distance to positions intermediate said remote and said adjacent positions of said first named series of rollers.

ALEXANDER W. MOFFAT.

REFERENCES CITED

The following references are of record in the file of this patent:

UNITED STATES PATENTS

| Number | Name | Date |
|---|---|---|
| 151,841 | Cass | June 9, 1874 |
| 1,667,267 | Pitcher | Apr. 24, 1928 |
| 1,717,358 | Adcock | June 18, 1929 |